United States Patent
Jia et al.

(10) Patent No.: US 11,827,769 B2
(45) Date of Patent: Nov. 28, 2023

(54) REINFORCEMENT OF ELASTOMERS BY REACTIVE IONIC SURFACTANT

(71) Applicants: Li Jia, Hudson, OH (US); Mengsha Qian, Dongguan (CN)

(72) Inventors: Li Jia, Hudson, OH (US); Mengsha Qian, Dongguan (CN)

(73) Assignee: The University of Akron, Akron, OH (US)

( * ) Notice: Subject to any disclaimer, the term of this patent is extended or adjusted under 35 U.S.C. 154(b) by 239 days.

(21) Appl. No.: 17/174,412

(22) Filed: Feb. 12, 2021

(65) Prior Publication Data

US 2021/0253828 A1    Aug. 19, 2021

Related U.S. Application Data

(60) Provisional application No. 62/975,800, filed on Feb. 13, 2020.

(51) Int. Cl.
| | | |
|---|---|---|
| *C08K 5/521* | (2006.01) | |
| *C08J 5/04* | (2006.01) | |
| *C08J 9/00* | (2006.01) | |
| *B29B 7/20* | (2006.01) | |
| *B29B 7/90* | (2006.01) | |
| *C08L 9/00* | (2006.01) | |
| *B29K 9/00* | (2006.01) | |

(52) U.S. Cl.
CPC ............... *C08K 5/521* (2013.01); *B29B 7/20* (2013.01); *B29B 7/90* (2013.01); *C08J 5/04* (2013.01); *C08L 9/00* (2013.01); *B29K 2009/00* (2013.01); *C08J 2309/00* (2013.01)

(58) Field of Classification Search
CPC ... C08K 5/521; C08J 5/04; C08L 9/00; B29B 7/20; B29B 7/90
USPC ........................................................ 524/127
See application file for complete search history.

(56) References Cited

FOREIGN PATENT DOCUMENTS

WO    WO-2014077364 A1 *   5/2014   ............... B60C 1/00

OTHER PUBLICATIONS

Mengsha Qian, Reinforcement of Elastomers by Reactive Ionic Surfactant Filler, May 2018, A Thesis, pp. 1-69 (Year: 2018).*

* cited by examiner

*Primary Examiner* — Deve V Hall
(74) *Attorney, Agent, or Firm* — Renner, Kenner, Greive, Bobak, Taylor & Weber

(57) ABSTRACT

Curable rubber compositions that include reactive ionic surfactants as reinforcing fillers are described, as well as methods for preparing composite rubber compounds by direct addition of ionic surfactant solutions into rubber latex.

16 Claims, 5 Drawing Sheets

REINFORCEMENT OF ELASTOMERS BY REACTIVE IONIC SURFACTANT

CROSS-REFERENCE TO RELATED APPLICATIONS

The present application claims priority to U.S. Provisional Patent Application Ser. No. 62/975,800 filed Feb. 13, 2020, the entirety of which is incorporated herein by reference.

FIELD OF THE INVENTION

This invention discloses the use of reactive ionic surfactants as reinforcing fillers for rubbers and the formation of composite rubber compounds by direct addition of the ionic surfactant solutions into rubber latex.

BACKGROUND OF THE INVENTION

Elastomers without reinforcement are too weak and soft to meet the requirements of practical applications. To achieve the necessary strength and stiffness, particulate fillers are used to reinforce thermoset rubber. For thermoplastic elastomers, microphase-separated hard domains play the role of stiffening and strengthening the elastomer.

In conventional rubber reinforcement, rubber reinforcement is carried out by addition of carbon black or silica. Rubber compounds are usually processed using an internal mixer. This mixing process is energy-intense. The mechanical shear within the mixer causes the rubber chains to break. For natural rubber and synthetic isoprene rubber, the molecular weight decreases considerably during mixing.

There is a need in the art for additional methods and compositions for reinforcing rubber compositions.

SUMMARY OF THE INVENTION

In one or more embodiments, the present invention provides a curable rubber composition comprising a reactive surfactant that may be represented by the formula:

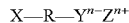

$$X\text{—}R\text{—}Y^{n-}Z^{n+}$$

where X is a reactive group that reacts with rubber to form a covalent bond, Y is an anionic group formally bearing "n" negative charges, Z is a cationic atom or group formally bearing n positive charges to balance the collective negative charges of Y, n is an integer of from 1 to 3, and R is an organic linking group.

In one or more embodiments, the present invention further provides a curable rubber composition that is prepared by a process comprising combining ingredients including a reactive ionic surfactant pre-mix that includes a reactive ionic surfactant dissolved or dispersed in a solvent, and a rubber pre-mix that includes one or more rubber components dissolved or dispersed in a solvent, mixing to form a dispersed mixture, and removing the solvent.

One or more embodiments of the present invention further provides a method for preparing a curable rubber composition that is prepared by a process comprising combining ingredients including a reactive ionic surfactant pre-mix that includes a reactive ionic surfactant dissolved or dispersed in a solvent, and a rubber pre-mix that includes one or more rubber components dissolved or dispersed in a solvent, mixing to form a dispersed mixture, and removing the solvent.

DETAILED DESCRIPTION OF ILLUSTRATIVE EMBODIMENTS

Figure 1:
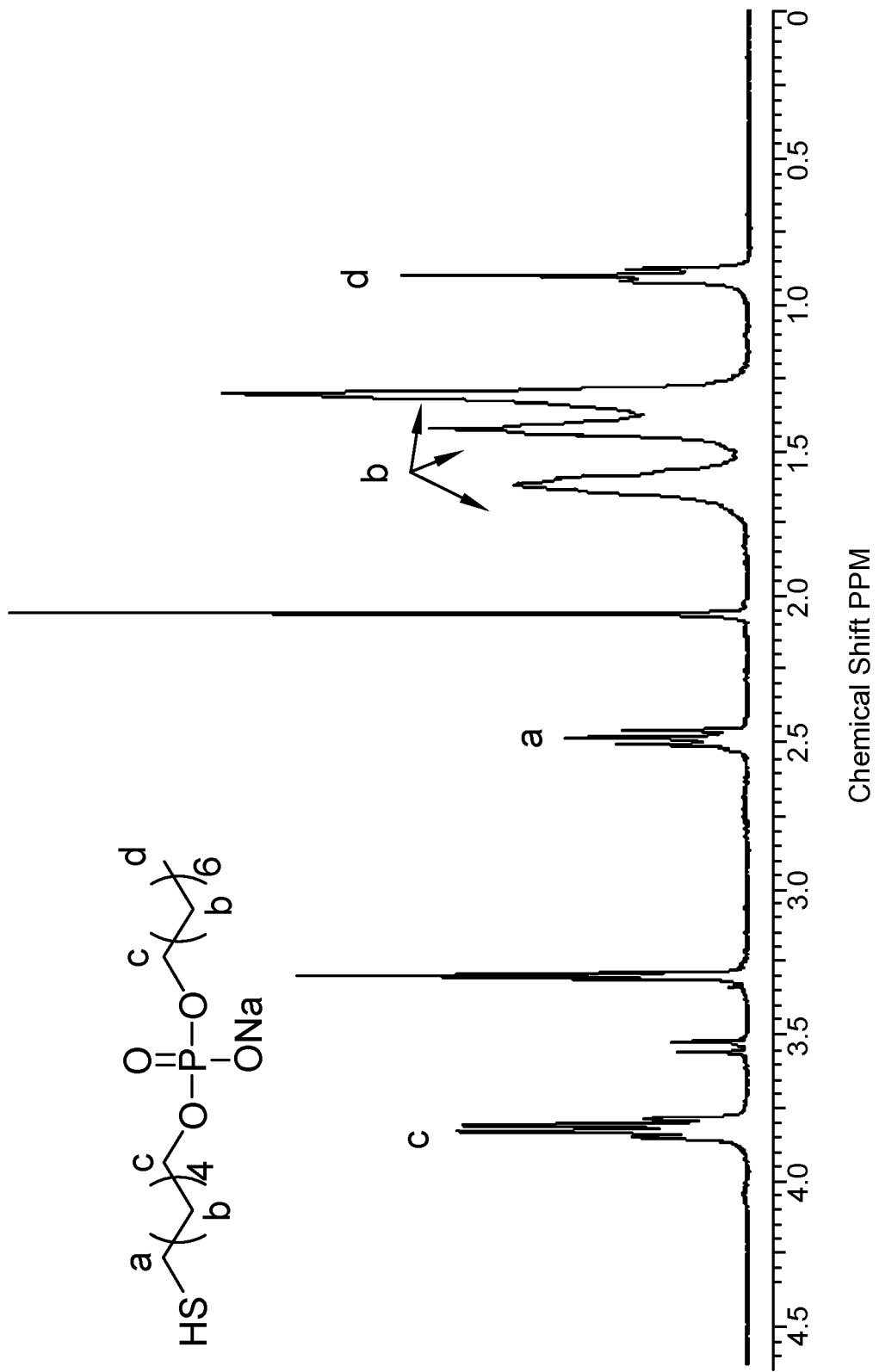
FIG. 1 is the $^1$H NMR spectra of the reactive ionic surfactant PNa shown in Scheme 1 (300 MHz, 25° C., CD$_3$OD).

The present invention is generally directed to rubber compositions that are reinforced using reactive ionic surfactants as reinforcing fillers. Composite rubber compounds, which may also be referred to as reinforced rubber compositions, are prepared by direct addition of ionic surfactant solutions into rubber latex. In one or more embodiments, the cure, i.e., vulcanized composite rubber compounds include covalent crosslinking and also physical crosslinking and reinforcement resulting from ionic aggregates.

Reinforced rubber compositions of the present invention may be prepared by combining one or more rubber components, a reactive ionic surfactant, and optionally, additional ingredients of the type typically found in reinforced rubber compositions, to form a curable rubber composition, and then at least partially curing the composition.

The rubber employed may be virtually any curable rubber. The curable rubber will include unsaturated active sites that crosslink upon curing to form the thermoset rubber.

In some embodiments, the thermosetting rubber is selected from the group consisting of polybutadiene, polyisoprene, poly(styrene-co-butadiene), poly (isobutylene-co-isoprene), natural rubber or a combination thereof.

In tire applications, the thermosetting rubber may be selected from the group consisting of styrene-butadiene rubber, polybutadiene rubber, butadiene rubber, polyisoprene or derivatives thereof. Standard additives include, but are not limited to, carbon black, stearic acid, antioxidants, waxes, silica, retarders, sulfur, accelerators or materials of the like. Such standard additives may be added in the appropriate stages and amounts, if necessary.

The reactive ionic surfactant includes at least one moiety that is capable of reacting with the curable rubber to form a covalent bond. This moiety may be referred to as the reactive group. The reactive ionic surfactant also includes at least one ionic moiety. The reactive group and the ionic group may be linked by a divalent organic linking group.

In one or more embodiments, the reactive group includes at least one functional group selected from sulfur-containing groups, unsaturated hydrocarbon groups, and aldehyde groups. Examples of sulfur-containing groups include thiol groups (S—H), thioaldehyde group, thioketone groups (C=S), and sulfur (S—S). Examples of unsaturated hydrocarbon groups include groups containing carbon-carbon double bonds and/or carbon-carbon triple bonds.

It will be understood that the ionic group includes at least one anionic atom or group (collectively referred to as an anionic group) and at least one cationic atom or group (collectively referred to as a cationic group). In one or more embodiments, the anionic group may be selected from phosphate groups, phosphonate groups, sulfate groups, sulfonate groups, and carboxylate groups. In one or more embodiments, the cationic group may be selected from alkali metals, alkaline earth metals, zinc, tetraalkylammoniums, and phosphonium ions. In one or more embodiments, the cationic group is sodium.

In one or more embodiments, the reactive ionic surfactant may be represented by the formula:

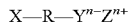

where X is a reactive group that reacts with rubber to form a covalent bond, Y is an anionic group formally bearing "n" negative charges, Z is a cationic atom or group formally bearing n positive charges to balance the collective negative charges of Y, n is an integer of from 1 to 3, and R is an organic linking group.

Optional ingredients include antioxidants, antidegradants, additional fillers, oils, plasticizers, resins, wax, and curatives.

Advantageously, the reactive ionic surfactant may be mixed directly with a rubber latex to prepare composite rubber compounds without the need for intense mechanical mixing. In one or more embodiments, the composite rubber compounds may be prepared using solvent-based mixing (which may also be referred to as solution mixed), mechanical mixing, or a combination thereof.

In one or more embodiments, a curable rubber composition may be prepared by co-dispersing a reactive ionic surfactant and one or more rubber components using volatile solvents or dispersants. Suitable solvents and dispersants include water, alcohols, ethers, esters, ketones, amides, and other common organic solvents and combinations thereof. and mixtures thereof. In one or more embodiments, a curable rubber composition is prepared by combining ingredients including a reactive ionic surfactant pre-mix that includes a reactive ionic surfactant dissolved or dispersed in a solvent, a rubber pre-mix (which may also be referred to as a rubber latex) that includes one or more rubber components dissolved or dispersed in a solvent, mixing to form a dispersed mixture, and removing the solvent.

In one or more embodiments, the composite rubber composition may be prepared by mechanical mixing, using an internal mixer, twin screw extruder, or two roll mill. In one or more embodiments, a curable rubber composition may be prepared by solvent-based mixing, and then one or more curatives may be added to the mixture by mechanical mixing. In other embodiments, one or more curatives may be added during the solvent-based mixing process.

In order to demonstrate the practice of the present invention, the following examples have been prepared and tested. The examples should not, however, be viewed as limiting the scope of the invention. The claims will serve to define the invention.

EXAMPLES

Materials

6-Mercapto-1-hexanol was obtained from TCI. The 1-octanol was obtained from Acros Organics. Anhydrous methanol, anhydrous diethyl ether and phosphorus oxychloride were obtained from Sigma-Aldrich. Sodium hydroxide was obtained from BDH Analytical Chemicals. Dicumyl peroxide (DCP) was obtained from Akrochem. Synthetic polyisoprene latex was obtained from Kraton Polymer.

Synthesis of PNa

A Schlenk flask was loaded with anhydrous diethyl ether (70 ml), phosphoryl chloride (0.03 mol), 1-octanol (0.03 mol) and triethylamine (0.03 mol) and stirred 30 min under nitrogen. Then, 6-mercapto-1-hexanol (0.03 mol) and triethylamine (0.03 mol) were added. The reaction was stirred overnight and quenched with deionized water (0.06 mol). The precipitated triethylamine hydrochloride salt was removed by filtration. The diethyl ether solution was then neutralized with NaOH (1 mol/L in anhydrous ethanol) to pH 7. The solvent was removed. The product was extracted with CHCl3 and crystallized by layering hexane on top of the solution.

Compounding and Vulcanization

The formulations of rubber composites are shown in Table 1. The compounds are designated as IR-xPNa-s, indicating solution mixed IR filled with x phr (part per hundred rubber) of the reactive surfactant PNa. Polyisoprene latex (8.14 g) containing polyisoprene rubber (5 g), DCP (0.1 g/ml in hexane) and PNa (0.1 g/ml in deionized water) were mixed with a mechanical stir in a beaker at room temperature overnight, at which time most of the solvents evaporated. The mixed compound was dried in a vacuum oven for two days at room temperature. The rubber compound was then milled into sheets on a two-roll mill at 50° C. The finished compound was compressed and cured at 160° C. to form sheets of 1 mm thickness. The curing time (190 plus 10 min) was measured by moving-die rheometer.

TABLE 1

Formulations of IR-PNa composites

| Composites | IR (phr) | PNa (phr) | DCP (phr) |
|---|---|---|---|
| IR-gum-s | 100 | 0 | 1 |
| IR-5PNa-s | 100 | 5 | 1 |
| IR-15PNa-s | 100 | 15 | 1 |

*The suffix "s" refers to solution mixed IR-PNA composites.

Characterization Techniques

Nuclear magnetic resonance (NMR) spectroscopy was performed on a Variant Mercury 300 instrument. Thermogravimetric analysis (TGA) was done on a TA Q500 instrument. The sample (~10 mg) was held in Tzero aluminum pans. Differential Scanning Calorimetry (DSC) was performed using a TA Q2000 instrument. The samples (~5 mg) were prepared in aluminum hermetic pans. Attenuated total reflection-Fourier Transform Infrared Spectroscopy (ATR-FTIR) spectra was recorded with a PerkinElmer spectrometer at 4 cm$^1$ resolution.

Moving-Die Rheometer

Moving-Die Rheometer (MOR) was used to measure the curing curve of different rubber at 160° C. Under a constant amplitude of oscillation at a given temperature, vulcanization is measured by the increase of torque.

Tensile Test

Tensile specimens were cut with an ASTM 638 11-98 Type V dumbbell die. Dumbbell samples were held with a 40 mm gap distance and attached extensometer with the initial gap of 10 mm was applied to measure the strain. Three tensile specimens were tested in each case. The crosshead speed was 50 mm/min.

Stress Relaxation

A 15 mm×5 mm strip was cut out from the vulcanized sheet. The stress relaxation test was performed by dynamic mechanical analyzer TA Q800 at room temperature. The preload force is 0.01 N and the strain is 10%. The stress was recorded as a function of time.

Swelling Test

About 0.1 g cured film (Winitiat) was weighed and immersed in 20 ml of toluene for one week at room temperature. Then, the swelled sample was wiped by paper towel and weighed (Wgel). The swollen sample was dried in vacuum oven at 70° C. to achieve a constant weight {Wdry). The crosslink densities were calculated by Flory-Rehner Equation 1:

$$\rho_c = -\frac{1}{2v_s} \frac{\ln(1-v_r)+v_r+\mathcal{X}v_r^2}{v_r^{\frac{1}{3}}-\frac{v_r}{2}}$$

where Vr is the volume fraction of rubber in the swollen gel, Pc is the crosslink density, $v_5$ is the molar volume of the solvent (toluene: 105.29 cm3/mol), X is the interaction parameter of the solvent and rubber (IR-toluene: 0.448).

Results

Synthesis and Characterization of Ionic Surfactant PNa

Figure 2:
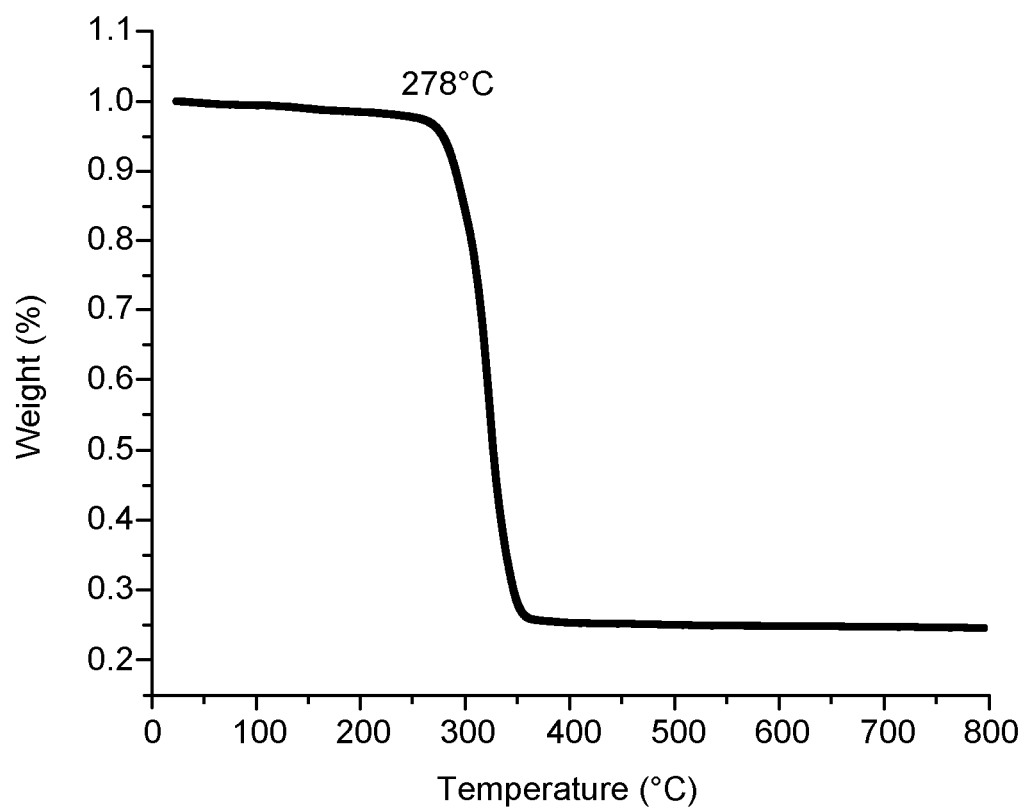
FIG. 2 is the TGA trace of PNa in nitrogen (N$_2$).
Figure 3:
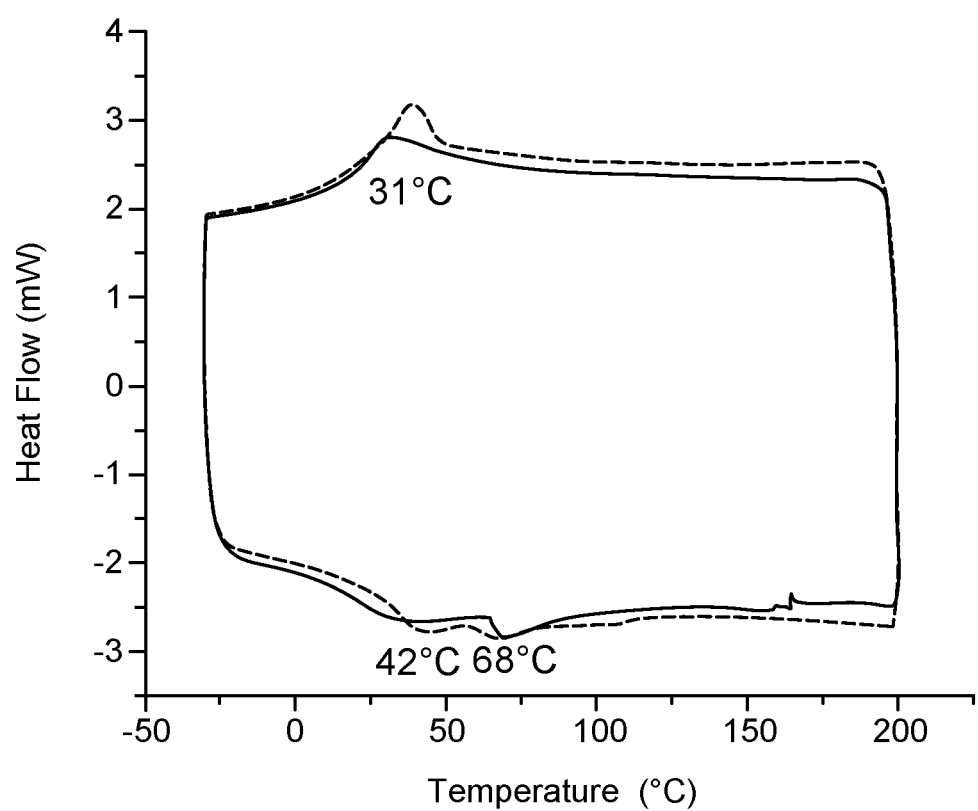
FIG. 3 is the DSC trace of PNa. The first heating-cooling cycle is in gray, and the second cycle is in black. The heating-cooling rate is 10° C./min.

The synthetic route of PNa is presented in Scheme 1. The proton Nuclear magnetic resonance spectrum of PNa in deuterated methanol (CD3OD) is shown in FIG. 1. As shown in FIGS. 2 and 3, the TGA trace of PNa indicates that its decomposition temperature is 278° C., and DSC shows that PNa has two melting peaks that close to each other and one crystallization peak.

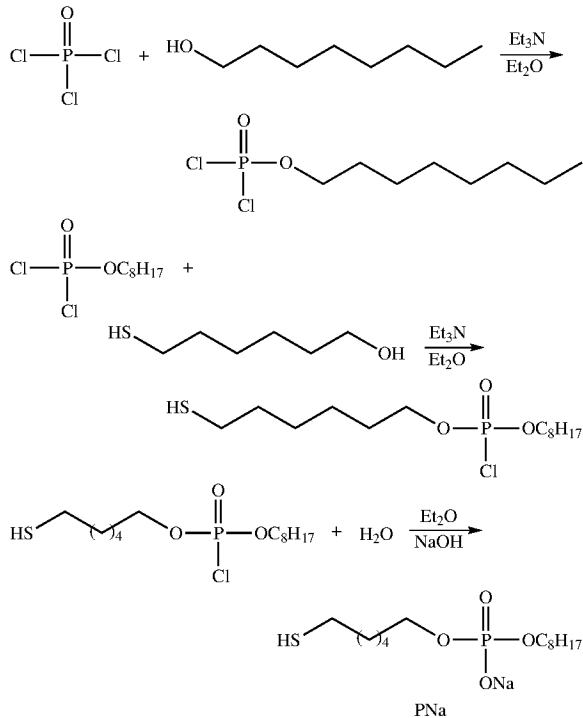

Scheme 1-Synthesis of PNa

Vulcanization

Figure 4:
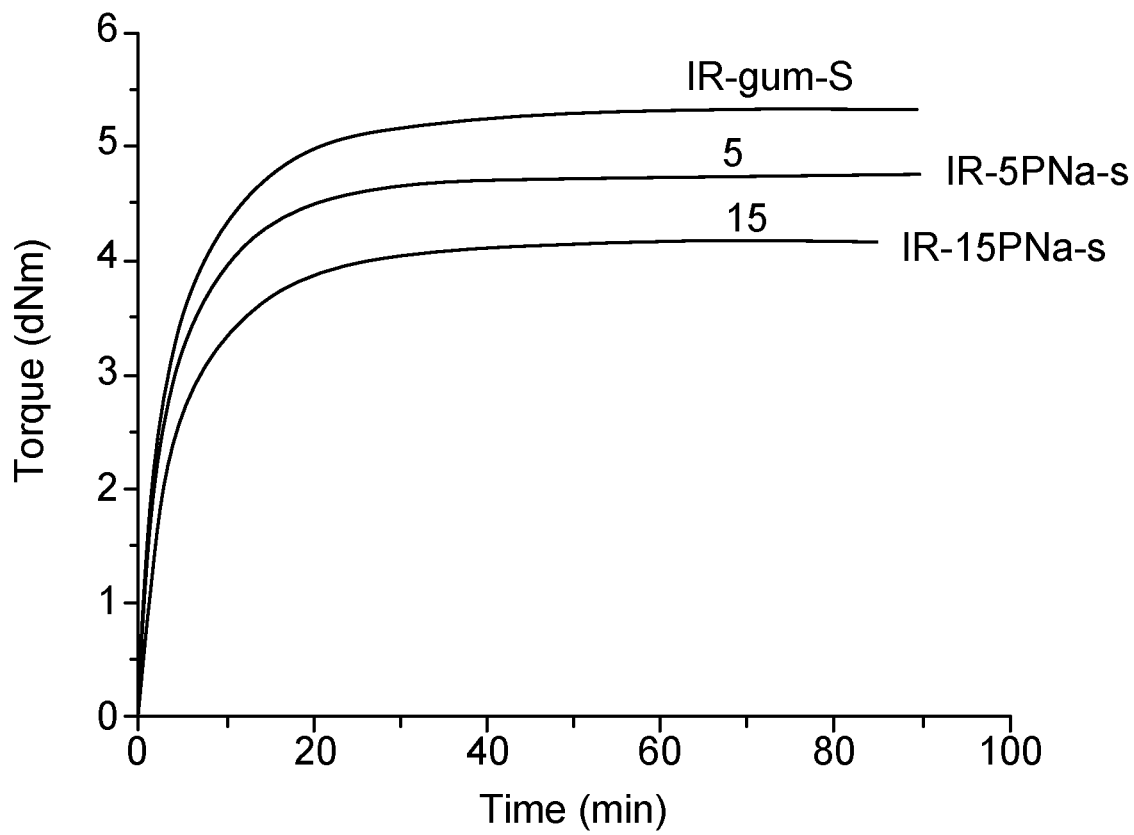
FIG. 4 is a graph showing the cooling curves of samples of solution mixed rubber.

The vulcanization kinetics of rubber samples were determined using a moving-die rheometer. The curing curves are shown in FIG. 4, and the key curing parameters are summarized in Table 2. The T90 times for all compounds are similar. All vulcanization was subsequently carried out at 160° C. for 30 min.

Swelling test was performed to measure the crosslink densities of cured rubber composites. The results are listed in Table 3. The crosslink densities are almost the same for JR-gum-s and IR-5PNa-s, and somewhat lower for IR-15PNa-s.

TABLE 2

Curing curve analysis of solution mixed rubber.

| phr | ML (dNm) | MH (dNm) | ts1 (min) | ts2 (min) | t10 (min) | t50 (min) | t90 (min) | t100 (min) |
|---|---|---|---|---|---|---|---|---|
| 0 | 1.11 | 5.34 | 1.57 | 3.62 | 0.94 | 3.94 | 18.22 | 89.99 |
| 5 | 0.98 | 4.76 | 1.63 | 4.04 | 0.83 | 3.67 | 17.04 | 90.06 |
| 15 | 0.72 | 4.18 | 2.05 | 5.21 | 0.99 | 4.06 | 18.58 | 85.08 |

TABLE 3

Crosslink densities of solution mixed rubber.

| phr | pc (mol/m³) | Mc (glmol) |
|---|---|---|
| 0 | 35.67 | 12754 |
| 5 | 35.51 | 12814 |
| 15 | 30.33 | 15002 |

Mechanical Properties

Figure 5:
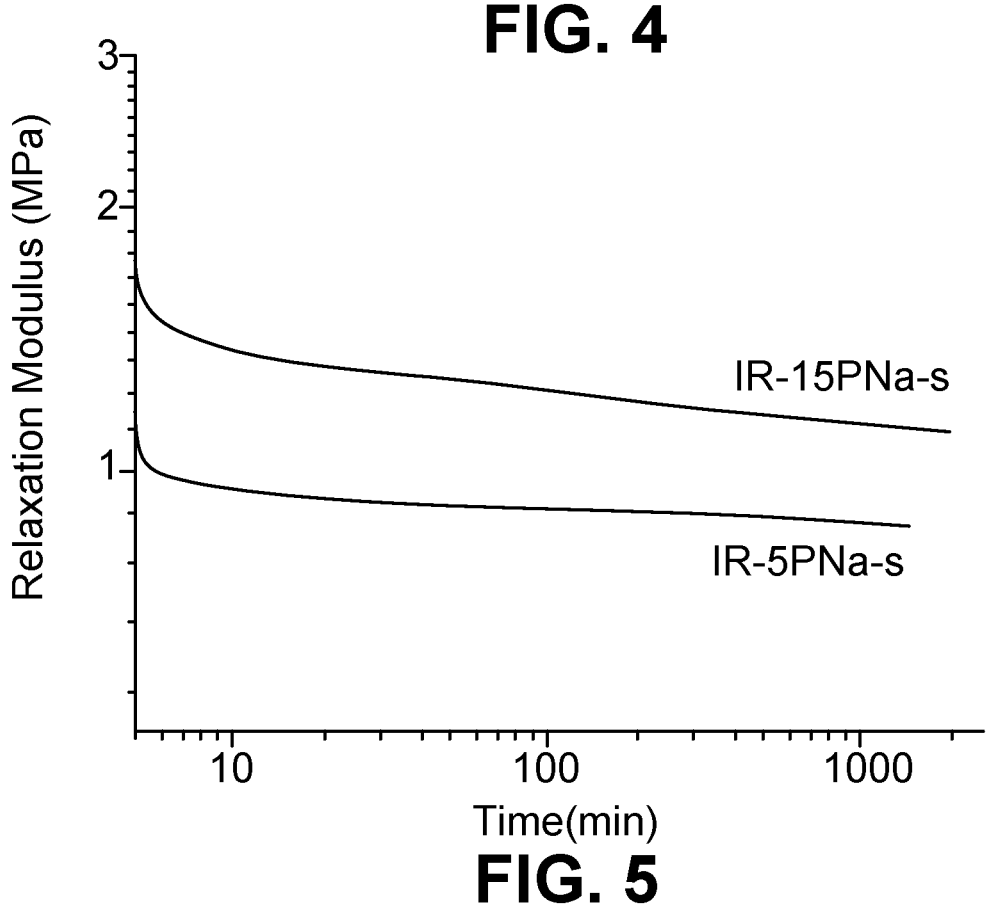
FIG. 5 is a graph showing the stress relaxation behavior of IR-5PNa-s and IR-5PNA-s.
Figure 6:
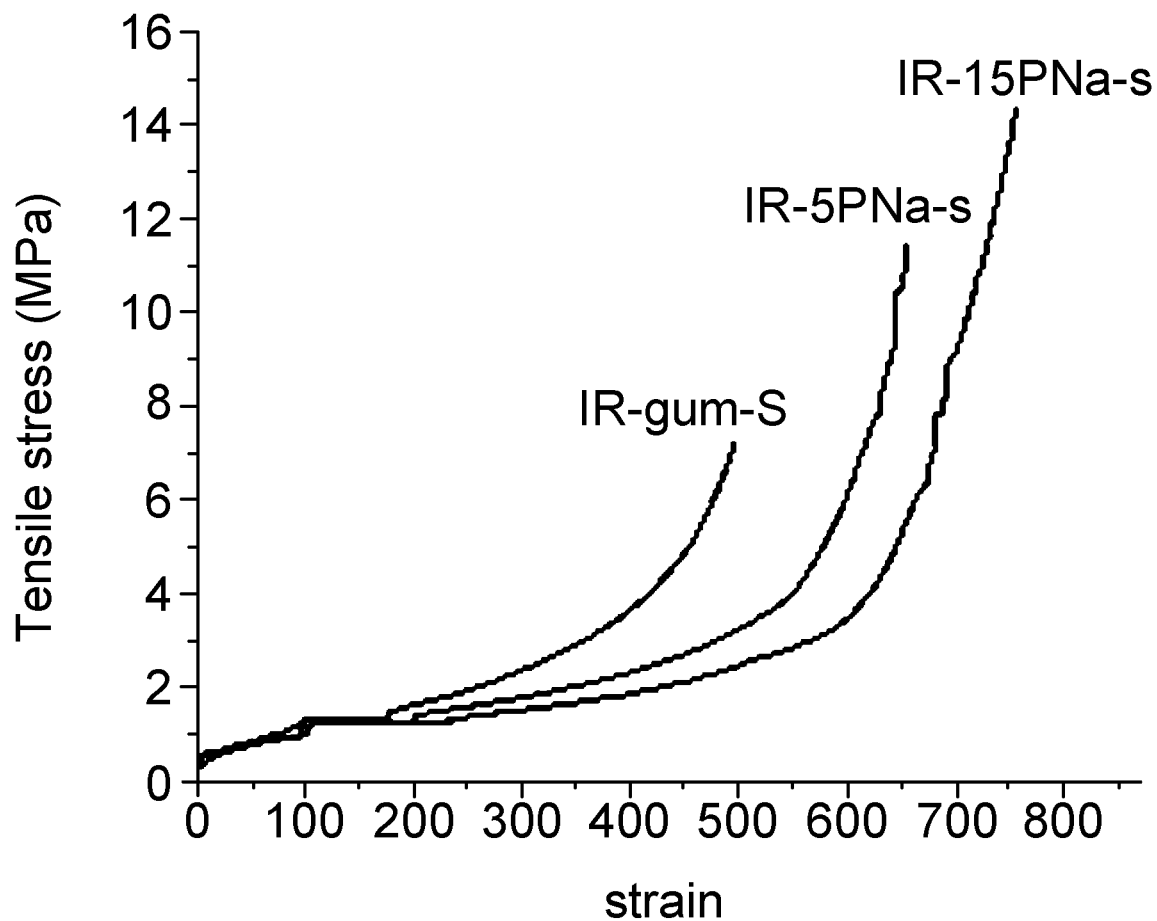
FIG. 6 is graph showing the stress-strain curves of cured IR-gum-s, IR-5PHa-s, and IR-15PNA-s.

Stress relaxation curves for IR-5PNa-s and IR-15PNa-s at 10% strain are shown in FIG. 5 below. These materials reach equilibrium plateau moduli in about 1 h as expected for viscoelastic solids. The plateau modulus level and plateau stress of IR-15PNa-s is larger than that of IR-5PNa-s. The stress-strain curves are shown in FIG. 6 and summarized in Table 4. The tensile strength, elongation at break and toughness of vulcanizates reinforced by PNa are significantly better than those of the gum rubber.

TABLE 4

Tensile test results of solution mixing samples

| phr | $\Sigma_b$ (MPa) | $E_b$ (%) | σ 100% (MPa) | σ 300% (MPa) | Toughness (J/cm3) |
|---|---|---|---|---|---|
| 0 | 8.64 | 532 | 1.01 | 2.35 | 14 |
| 5 | 13.36 | 653 | 1.00 | 1.76 | 20 |
| 15 | 14.48 | 738.94 | 1.00 | 1.43 | 23 |

Although the invention has been described in detail with particular reference to certain embodiments detailed herein, other embodiments can achieve the same results. Variations and modifications of the present invention will be obvious to those skilled in the art and the present invention is intended to cover in the appended claims all such modifications and equivalents.

What is claimed is:

1. A curable rubber composition comprising a reactive surfactant represented by the formula:

X—R—Y$^{n-}$Z$^{n+}$ where X is a reactive group that reacts with rubber to form a covalent bond, Y is an anionic group formally bearing "n" negative charges, Z is a cationic atom or group formally bearing n positive charges to balance the collective negative charges of Y, n is an integer of from 1 to 3, and R is an organic linking group.

2. The curable rubber composition of claim 1, wherein X includes at least one functional group selected from sulfur-containing groups, unsaturated hydrocarbon groups, and aldehyde groups.

3. The curable rubber composition of claim 1, wherein X is a thiol group (S—H), a thioaldehyde group, a thioketone group (C=S), or a sulfur group (S—S).

4. The curable rubber composition of claim 1, wherein X is a thiol group (S—H).

5. The curable rubber composition of claim 1, wherein X is a thioketone group (C=S).

6. The curable rubber composition of claim 1, wherein X includes an S—S group.

7. The curable rubber composition of claim 1, wherein Y is selected from phosphate groups, phosphonate groups, sulfate groups, sulfonate groups, and carboxylate groups.

8. The curable rubber composition of claim 1, wherein Z is selected from alkali metal ions, alkaline earth metal ions, zinc ions, tetraalkylammonium ions, and phosphonium ions.

9. The curable rubber composition of claim 1, wherein the rubber composition further comprises at least one thermosetting rubber selected from the group consisting of polybutadiene, polyisoprene, poly(styrene-co-butadiene), poly(isobutylene-co-isoprene), natural rubber or a combination thereof.

10. A curable rubber composition that is prepared by a process comprising:
   combining ingredients including a reactive ionic surfactant pre-mix that includes a reactive ionic surfactant dissolved or dispersed in a solvent, and a rubber pre-mix that includes one or more rubber components dissolved or dispersed in a solvent,
   mixing to form a dispersed mixture, and
   removing the solvent.

11. The curable rubber composition of claim 10, wherein the process further comprises mixing in an internal mixer, twin screw extruder, or two roll mill.

12. The curable rubber composition of claim 10, wherein the reactive ionic surfactant is represented by the formula:

X—R—Y$^{n-}$Z$^{n+}$ where X is a reactive group that reacts with rubber to form a covalent bond, Y is an anionic group formally bearing "n" negative charges, Z is a cationic atom or group formally bearing n positive charges to balance the collective negative charges of Y, n is an integer of from 1 to 3, and R is an organic linking group.

13. The curable rubber composition of claim 10, wherein the rubber is selected from the group consisting of polybutadiene, polyisoprene, poly(styrene-co-butadiene), poly(isobutylene-co-isoprene), natural rubber or a combination thereof.

14. A method for preparing a curable rubber composition, the method comprising:
   combining ingredients including a reactive ionic surfactant pre-mix that includes a reactive ionic surfactant dissolved or dispersed in a solvent, and a rubber pre-mix that includes one or more rubber components dissolved or dispersed in a solvent, wherein the reactive ionic surfactant is represented by the formula:

X—R—Y$^{n-}$Z$^{n+}$ where X is a reactive group that reacts with rubber to form a covalent bond, Y is an anionic group formally bearing "n" negative charges, Z is a cationic atom or group formally bearing n positive charges to balance the collective negative charges of Y, n is an integer of from 1 to 3, and R is an organic linking group,
   mixing to form a dispersed mixture, and
   removing the solvent.

15. The method of claim 14, wherein the method further comprises mixing the dispersed mixture, after removing the solvent, in an internal mixer, twin screw extruder, or two roll mill.

16. The method of claim 14, wherein the rubber is selected from the group consisting of polybutadiene, polyisoprene, poly(styrene-co-butadiene), poly (isobutylene-co-isoprene), natural rubber or a combination thereof.

* * * * *